(12) United States Patent
Mostovych

(10) Patent No.: US 8,332,661 B2
(45) Date of Patent: Dec. 11, 2012

(54) METHOD AND APPARATUS FOR PREVENTION OF TAMPERING, UNAUTHORIZED USE, AND UNAUTHORIZED EXTRACTION OF INFORMATION FROM MICRODEVICES

(76) Inventor: Andrew N. Mostovych, Silver Spring, MD (US)

( * ) Notice: Subject to any disclaimer, the term of this patent is extended or adjusted under 35 U.S.C. 154(b) by 1126 days.

(21) Appl. No.: 12/191,725

(22) Filed: Sep. 11, 2008

(65) Prior Publication Data
US 2010/0064371 A1 Mar. 11, 2010

(51) Int. Cl.
*G06F 11/30* (2006.01)
(52) U.S. Cl. ............................. 713/194; 726/26; 726/34
(58) Field of Classification Search .................. 713/194; 726/26, 34
See application file for complete search history.

(56) References Cited

U.S. PATENT DOCUMENTS

| | | | |
|---|---|---|---|
| 3,879,636 A * | 4/1975 | Lamoureux | 315/371 |
| 4,365,337 A | 12/1982 | Cirkel et al. | |
| 4,722,340 A * | 2/1988 | Takayama et al. | 601/4 |
| 4,727,262 A | 2/1988 | O'Loughlin | |
| 4,757,295 A | 7/1988 | Pike | |
| 5,311,067 A | 5/1994 | Grothaus et al. | |
| 5,398,283 A | 3/1995 | Virga | |
| 5,798,579 A | 8/1998 | McPhee | |
| 5,821,582 A * | 10/1998 | Daum | 257/327 |
| 5,937,159 A | 8/1999 | Meyers et al. | |
| 6,000,022 A * | 12/1999 | Manning | 711/167 |
| 6,032,259 A | 2/2000 | Nemoto | |
| 6,052,270 A * | 4/2000 | Kinge | 361/253 |
| 6,060,791 A | 5/2000 | Goerz et al. | |
| 6,091,233 A * | 7/2000 | Hwang et al. | 323/222 |
| 6,396,400 B1 * | 5/2002 | Epstein et al. | 340/550 |
| 6,697,408 B2 * | 2/2004 | Kennedy et al. | 372/55 |
| 6,934,437 B2 * | 8/2005 | Gruhlke et al. | 385/16 |
| 7,170,198 B2 | 1/2007 | Sack | |
| 7,247,037 B2 * | 7/2007 | Smadi et al. | 439/181 |
| 7,289,311 B2 | 10/2007 | Hosking | |
| 7,474,017 B2 | 1/2009 | Mayes | |
| 7,483,896 B2 | 1/2009 | Johnson | |
| 7,601,205 B2 * | 10/2009 | Furukawa et al. | 96/69 |
| 7,755,217 B2 * | 7/2010 | Heuermann | 307/110 |
| 7,850,907 B2 * | 12/2010 | Sundararajan | 422/50 |
| 7,989,987 B2 * | 8/2011 | McDonald | 307/108 |

(Continued)

OTHER PUBLICATIONS

Knovel Critical Tables (2nd Edition) 2008, Table of Basic Physical Properties of Chemical Compounds.*

*Primary Examiner* — Jeffrey Pwu
*Assistant Examiner* — Carlos Amorin
(74) *Attorney, Agent, or Firm* — Intellectual Property Strategists, L.L.C.; Miodrag Cekic

(57) ABSTRACT

A method and an apparatus for securing stand-alone microdevices or parts of larger processing devices are arranged for prevention of tampering, unauthorized use, and unauthorized extraction of information from an information containing region of the secured microdevice. The method includes implementation of control protocols and hardware which monitor the conditions of secured microdevices and generate commands to trigger obliteration of information; establishment of a local energy storage device which stores energy to be used to perform the controlled obliteration of information; establishment of localized controlled release of the stored energy from the local energy storage device and deposition of the stored energy in the proximity of the information containing regions of the secured microdevices, upon generation of a command to trigger the obliteration of information; and maintenance of conditions for controlled release of the energy stored in the local energy storage upon generation of the command to trigger.

49 Claims, 13 Drawing Sheets

U.S. PATENT DOCUMENTS

| | | |
|---|---|---|
| 2002/0034306 A1 | 3/2002 | Owada et al. |
| 2003/0013241 A1* | 1/2003 | Rockwell et al. ............. 438/197 |
| 2003/0054879 A1 | 3/2003 | Schneier et al. |
| 2004/0012613 A1* | 1/2004 | Rast ............................ 345/632 |
| 2004/0255134 A1 | 12/2004 | Miyamoto |
| 2005/0105737 A1 | 5/2005 | Asano |
| 2005/0231891 A1* | 10/2005 | Harvey ........................ 361/502 |
| 2008/0129657 A1* | 6/2008 | Song ............................... 345/60 |
| 2009/0178144 A1* | 7/2009 | Redlich et al. .................. 726/27 |
| 2009/0220088 A1* | 9/2009 | Lu et al. ........................ 380/277 |
| 2010/0049991 A1* | 2/2010 | Frenkel et al. ................ 713/193 |
| 2010/0154555 A1* | 6/2010 | Sumigawa et al. ............. 73/777 |
| 2011/0299810 A1* | 12/2011 | Binder ............................ 385/24 |
| 2011/0314435 A1* | 12/2011 | Landsberger et al. ........ 716/122 |

* cited by examiner

METHOD AND APPARATUS FOR PREVENTION OF TAMPERING, UNAUTHORIZED USE, AND UNAUTHORIZED EXTRACTION OF INFORMATION FROM MICRODEVICES

STATEMENT REGARDING FEDERALLY SPONSORED RESEARCH AND DEVELOPMENT

This invention was made with Government support under Contract No. W31P4Q-06-C-0401 awarded by the US Army Aviation and Missile Command at Redstone Arsenal, Ala. The US Government has certain rights in the invention.

FIELD OF THE INVENTION

The invention relates to an apparatus and a method for prevention of tampering, unauthorized use, and unauthorized extraction of information from information containing regions of microdevices which include but are not limited to electric, electromagnetic, electronic, photonic, electro-mechanical, electro-chemical, electro-fluidic, and hybrid devices having microscopic or sub-microscopic structural or functional components. The information under protection from unauthorized access can include any or all of: stored data, incompletely erased data, and prearranged structures or physical device architectures containing intrinsic information about functions, programs, designs, or fabrication processes of the microdevice under protection. The targeted microdevice may operate as an individual device or be assembled as a constituent of a more complex processing device having a plurality of microdevices arranged and programmed to perform a plurality of processes or applications. The protection from tampering, unauthorized use, and unauthorized extraction of information is achieved by irreversible obliteration of the information containing structures and media using electrical energy from high power electrical drivers that is delivered and deposited in or in the vicinity of individual microdevices or targeted microdevices that are connected to other constituents of the processing devices.

BACKGROUND OF THE INVENTION

The prevention of tampering, unauthorized use, and unauthorized extraction of information from microdevices is a long standing and extensive multidisciplinary problem. The strategies of prevention can range from secrecy protection of designs and production processes of a particular microdevice to the broad area of data encryption and protected data exchange and storage. The domain of the present invention is protection of stored and structure-related information incorporated in microdevices by the physical destruction of the microdevice regions containing such information in the event that tampering, unauthorized use, and/or unauthorized extraction of such information is likely to occur. Various embodiments of the present invention employ usage of high power electrical drivers that deliver sufficient electrical energy for permanent destruction of the information containing structures of protected microdevices.

Today, the most common example of a microdevice that may need to be protected from tampering, unauthorized use, and unauthorized extraction of information is the electronic microchip also commonly known as an "integrated circuit." Electronic microchips are ubiquitous in industrial, military, and consumer products. With this in mind, some of the presented embodiments of the invention are illustrated and evaluated using an electronic microchip as a target. However, it is important to note that the present invention is not limited to electronic devices or microchips. Apparatuses and methods in accordance with the present invention can be used to obliterate information on a variety of microdevices including, but not limited to, magnetic memory strips and media; removable memory modules and cards; security identification cards, chips, and keys; RFID tags and interrogators; MEMS; biochips; sensors; and other electronic, electro-mechanical, photonic, fluidic, chemical, and hybrid devices.

Newly developed electrical high power pulsed technology selectively obliterates targeted information containing structures by providing a controlled high power discharge in the proximity of the information containing structures. Various embodiments of the present invention include methods and devices invented for commanded obliteration of the information containing structures under situations where physical control of protected microdevices may be lost and where it is necessary to prevent hostile and unauthorized users from gaining and benefiting from the use of the microdevice or from the information contained in the microdevice even if they gain physical control of the protected microdevice. These embodiments usually require protection devices designed to integrate with the microdevices either permanently or as additional safety modules which, in an off or stand-by mode of operation, allow for normal function of the processing microdevices, but when activated obliterate the targeted information. Many of these embodiments can also be used to obliterate sensitive information and incompletely erased data on replaced or discarded microdevices before they are disposed or removed from the controlled environments.

Apparatuses and methods of the present invention differ from the current art of information obliteration which often involves information destruction facilities that are improvisations of equipment originally designed for other purposes. Examples of this include various industrial scale furnaces, corrosive chemical baths, or even construction equipment driven over the discarded processing devices. Improvised processes of the prior art may fail to achieve complete information obliteration. For example, virtually the entire content of a flash memory chip can be reconstructed even if the housing is severely damaged and connectors broken. In addition, the improvised methods and devices of prior art are difficult to use under time critical emergency circumstances.

SUMMARY OF THE INVENTION

The present invention considers a method and an apparatus for prevention of tampering, unauthorized use, and unauthorized extraction of information from one or more information containing regions of a secured microdevice in a processing device by controlled obliteration of said information. The method includes implementation of control protocols and hardware which monitor the conditions of secured microdevices and generate commands to trigger said controlled obliteration of information; establishment of a local energy storage device which stores energy to be used to perform said controlled obliteration of information; establishment of localized controlled release of the stored energy from the local energy storage device and at least partial deposition of the stored energy in the proximity of the information containing regions of the secured microdevices upon generation of a command to trigger said controlled obliteration of information; and maintenance of conditions for controlled release of the energy stored in the local energy storage upon generation of a command to trigger said controlled obliteration of information for the duration of time necessary to achieve desired controlled obliteration of said information.

The apparatus in accordance with the present invention includes control hardware which monitors conditions of secured microdevices and generates commands to trigger said controlled obliteration of information; a local energy storage device which stores energy to be used to perform said controlled obliteration of information; and a circuit for localized controlled release of the stored energy from the local energy storage device and at least partial deposition of the stored energy in the proximity of the information containing regions of the secured microdevices upon generation of a command to trigger said controlled obliteration of information.

The secured microdevice in accordance with the present invention for use in a processing device resistant to tampering and unauthorized extraction of information includes at least one information containing region with a structure organized to store and/or process information, a protective housing, contact connectors and associated conduits for conduction of information, and a system for localized controlled release of the energy in the proximity of the information containing region for controlled obliteration of information contained in the information containing region.

The information in accordance with the present invention that is contained, stored, and processed by the secured microdevice is the identifiable physical states and structures of physical matter or fields that are in and/or move in and out of the microdevice. Physical matter is all inclusive and is understood to also include biological substances, organic substances, biological cells, viruses, organisms, plants, and fungi. Without presenting an exhaustive list, some examples of information include: digital or analog modulation of electrical current; voltage levels in memory cells that correspond to 0, 1, and other level logic states; changes in memory cell microstructure as a result of ion electromigration; pattern and design of transistors, resistors, capacitors, and other components inside an integrated circuit die; polarization, spectral, phase and other physical properties of light and other electromagnetic radiation transmitted, reflected, absorbed or internally propagated by a microdevice; structure and function of active and passive optical systems; micro-optics; structure and function of micro-machines; chemical composition of fluids or gases; concentration and identity of microorganisms or spores; blood properties; etc.

The Flowchart in FIG. 1 illustrates the operation processes of a device for prevention of tampering, unauthorized use, and unauthorized extraction of information from a secured microdevice in accordance with one embodiment of the present invention. The illustrated embodiment includes options for triggering the information obliteration after a preset time period or upon detection of a tampering event. It should be understood that embodiments which include only one of the above (or other appropriate) triggering events are also in the scope of the present invention.

BRIEF DESCRIPTION OF THE DRAWINGS

Like reference numerals identify corresponding parts throughout the drawings.

DETAILED DESCRIPTION OF THE INVENTION

Figure 1:
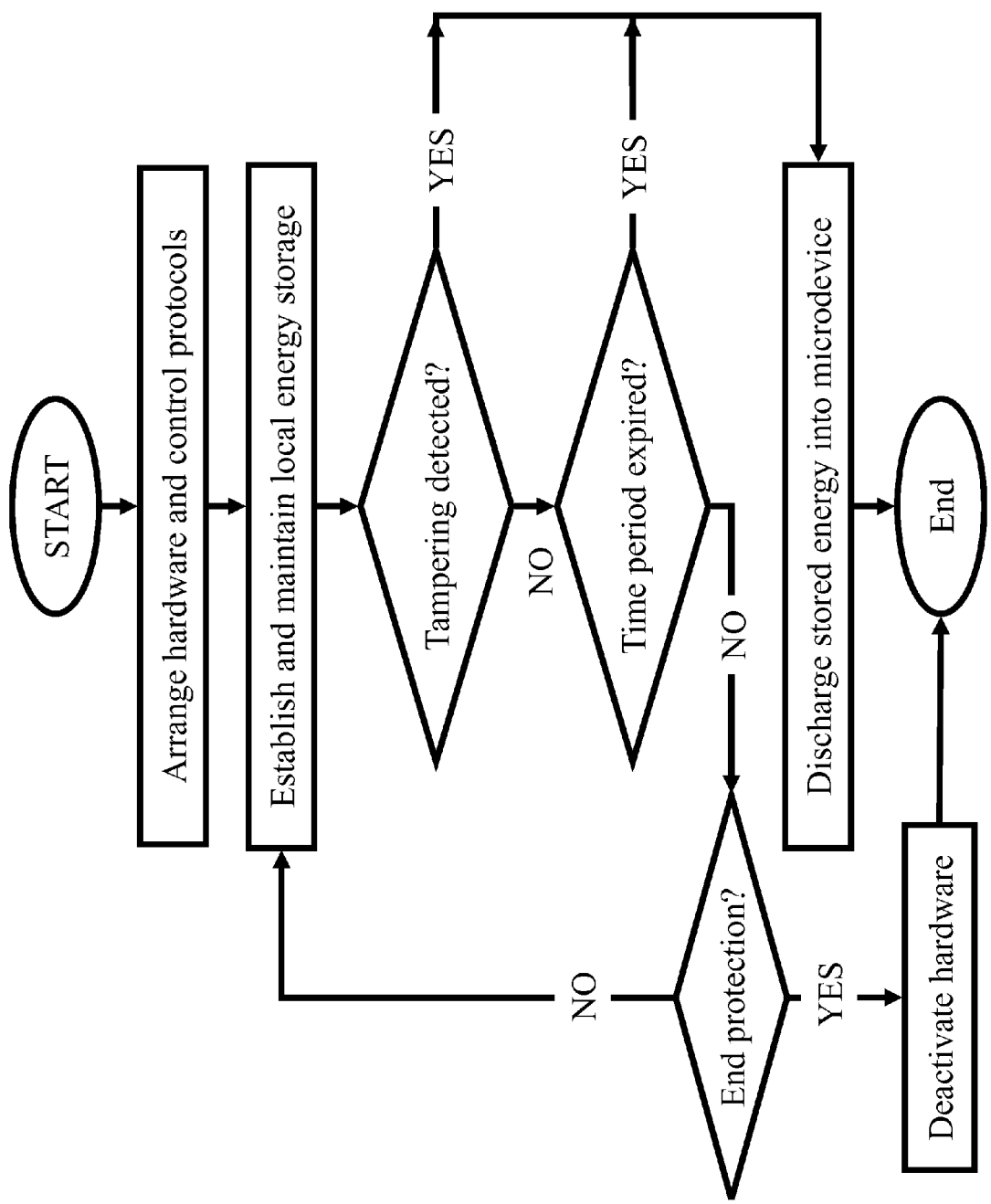
FIG. 1 is a flow chart illustrating functions of an embodiment of apparatus in accordance with the present invention.
Figure 2:
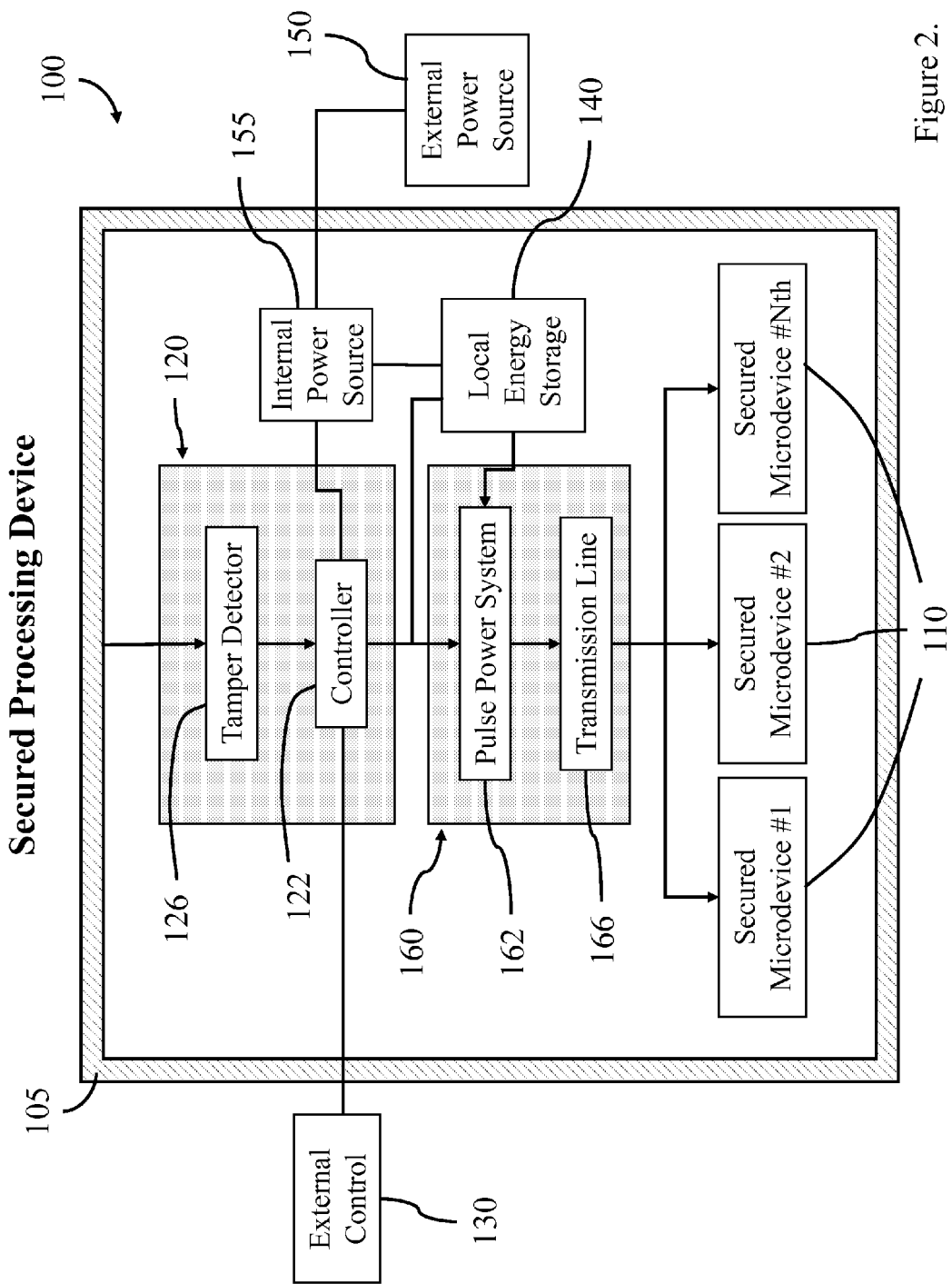
FIG. 2 is a schematic view of an embodiment of apparatus in accordance with the present invention.

A simplified schematic representation of an embodiment of a secured processing device 100 in accordance with the present invention is given in FIG. 2. The secured processing device 100 of the illustrated embodiment is comprised of a control system 120, a circuit for controlled release of stored energy 160, a local energy storage device 140, and at least one secured microdevice 110 that may be: a separate device; a functional constituent of a processing device arranged on a surface or a separate volume of the processing device; a distinct portion of a circuit or physical structure arranged on a surface or in a volume; an integrated circuit component or an assembly of integrated circuits; and/or a separate electronic, optical, optoelectronic, electromagnetic, electromechanical, electroacoustic, biological, chemical, fluidic or other physical apparatus containing sensitive information to be controllably obliterated.

The secured processing device 100 illustrated in FIG. 2 includes a control system 120 which can perform the following functions: monitor various conditions of the secured processing device 100, interface with external control devices 130, interface with external and internal power sources 150 and 155, control the operation of local energy storage device 140, and control the circuit for controlled release of locally stored energy 160 to the secured microdevices 110. In some embodiments the control system 120 has a controller 122 and tamper detector 126. The controller 122 controls the security functions of the processing device 100, receives and processes data from the tamper detector 126, and generates commands to trigger the controlled obliteration of information. The controller 122 can be in continuous or intermittent communication with an external control 130 from which, depending on the particular embodiment, the controller receives initial programming information, risk evaluation updates, status of processing devices, and, if necessary, an external control signal for the controller 122 to initiate the procedures of obliteration of information. The tamper detector 126 is arranged to detect conditions on the boundaries 105 of the protected processing device 100 and at particular points in the system interior. The tamper detector 126 collects data related to possible tampering activities and supplies the controller 122 with the warning signals indicative of potential tampering or unauthorized information extraction activities, which, after processing, can result in a controller 122 generated command to obliterate the information.

In alternative embodiments, the controller 122 incorporates an internal clock and programs with instructions to initiate the obliteration process after the expiration of a programmed time period. The time period can be measured either from the predetermined time point established during programming of the controller 122, or from the timing signals generated by the external controller 130.

Embodiments that incorporate a local energy storage device 140, which is arranged to store energy locally to be used to perform the controlled obliteration of information, exhibit sufficiently fast pulse power operation capable of depositing the locally stored energy in a predetermined period of time in order to maximize the destructive power that can be applied to the information containing regions of the secured microdevices. The local energy storage is usually powered by an external power source 150, which is normally shared with the other components external to the processing device 100. However, when external power is not available, as in emergencies, in tampering attempts, or in long term stand-alone application, the local energy storage 140 can also be powered by an internal power source 155, typically including chemical batteries or ultracapacitors.

A circuit for localized controlled release of the stored energy 160 from the local energy storage device 140 is arranged for at least partial deposition of the stored energy in the proximity of the information containing regions of the secured microdevices 110 upon generation of a command to trigger the controlled obliteration of information. In some embodiments the circuit for localized controlled release of energy 160 includes a pulse powered system 162 arranged to generate at least one high voltage pulse and a transmission line 166 arranged to conduct the generated pulse with minimized losses into or into the proximity of the secured microdevice 110.

Figure 3:
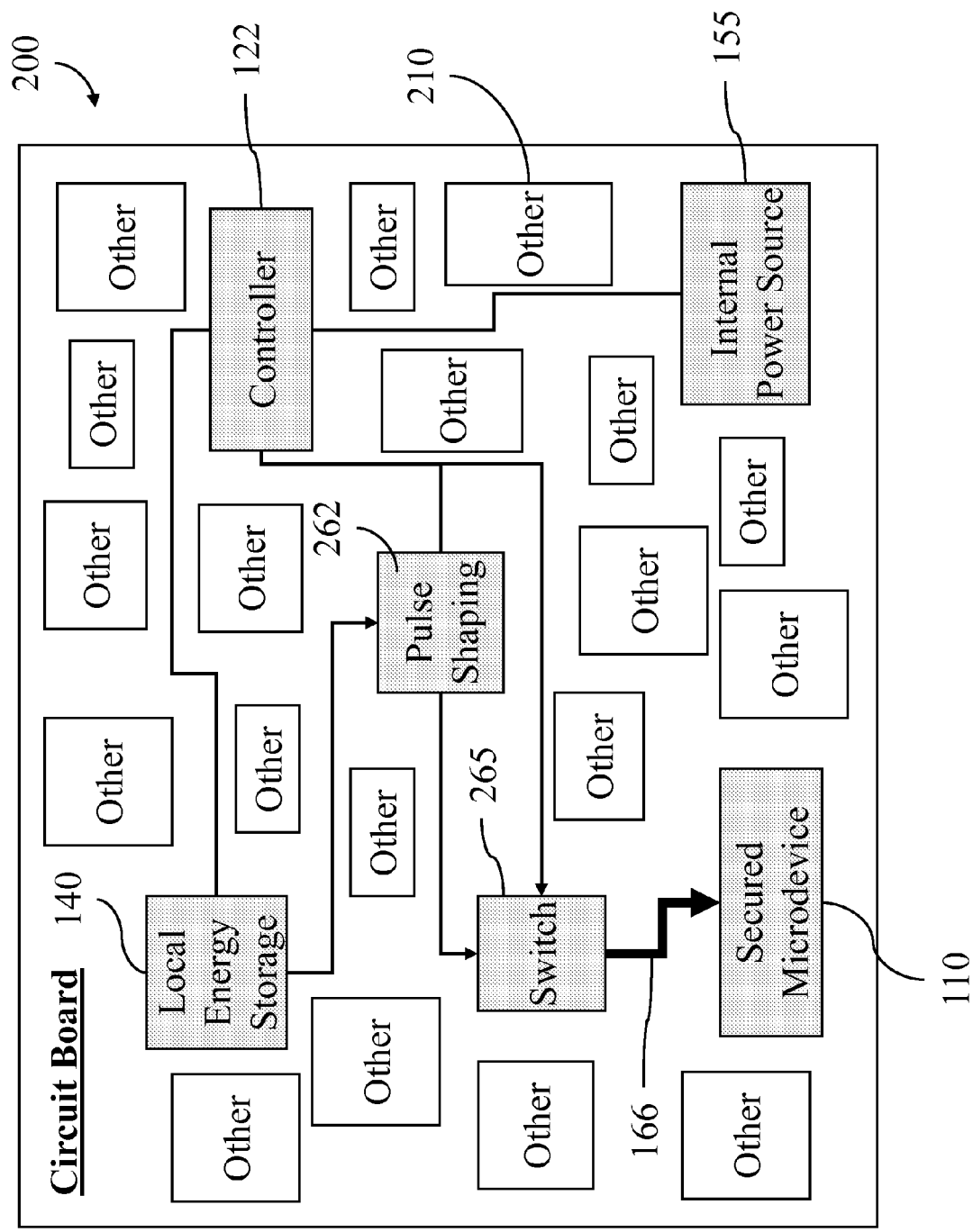
FIG. 3 is a schematic view of an embodiment of a circuit board integrated apparatus in accordance with the present invention.

An embodiment of an apparatus in accordance with the current invention, incorporated in a circuit on a secure circuit board 200, is illustrated in FIG. 3. This embodiment is representative of secured processing devices where the components necessary for obliteration of secured information are dispersed among additional other circuit components 210 that are necessary for the general circuit board operation but where the other components 210 are not part of the circuit that initiates or produces obliteration of secured information. An internal power source 155 is controlled by the controller 122 to provide charge for the local energy storage 140 which is also controlled by the controller 122. The controller 122 can be connected to the tamper detector (not shown in FIG. 3) which may be located elsewhere, closer to the outer boundaries of the protected processing device. During the act of obliteration of information from the secured microdevice 110, stored energy is discharged in at least one high-power pulse formed in a pulse shaping device 262. By engaging a switch 265, pulses are delivered to the vicinity of the secured microdevice 110 via the transmission line 166.

Figure 4:
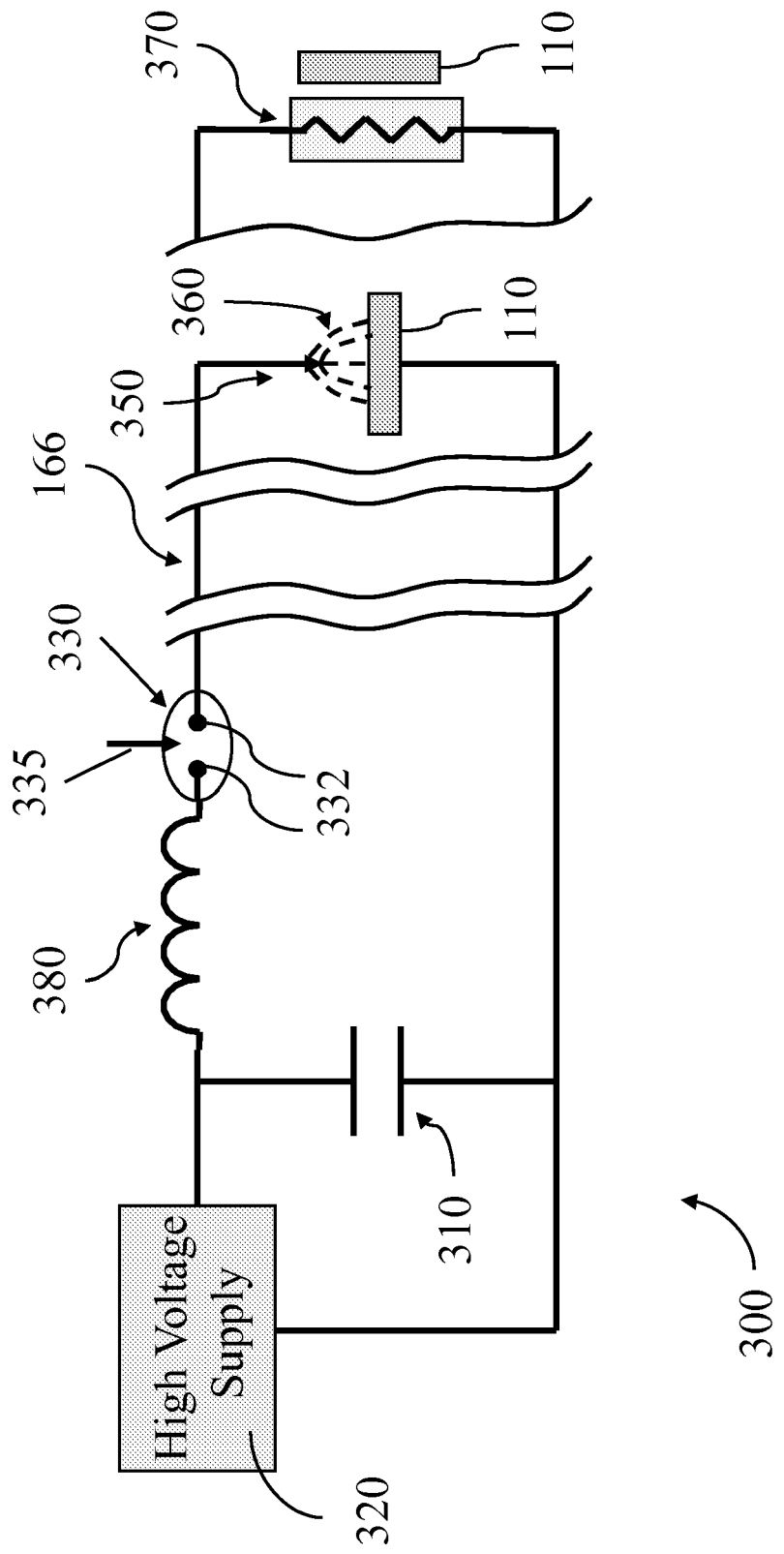
FIG. 4 is a schematic view of an embodiment of apparatus in accordance with the present invention.

FIG. 4 illustrates a simplified schematic representation of embodiments of the apparatus 300 that uses high voltage capacitor 310 (or a plurality of connected capacitive units) as the local energy storage. The capacitor is charged by a high voltage supply 320 to store energy in the form of strong electric fields generated by a process of electric charge separation in the interior of the capacitor 310. The capacitor 310 is triggered by a spark gap 330 into a transmission line 166. The spark gap 330 can operate in a self-breakdown mode by generating a conductive medium between electrodes 332 whenever the voltage on the capacitor 310 exceeds a predetermined threshold range of values, or can be triggered via a trigger electrode 335 using a trigger pulse initiated by the controller (not shown in FIG. 4). The conductive medium between the spark gap electrodes 332 allows for the discharge current pulse to flow from the capacitor 310 through an inductor 380 and the gap 330 into a transmission line 166. The shape of the current pulse is conditioned by the capacitance of the capacitor 310, inductance of the inductor 380, switching and conducting characteristics of the spark gap 330, the impedance of the transmission line 166, and the impedance of the load terminating the transmission line. The transmission line 166 is terminated on the end opposite to the capacitor 310 by at least one discharge electrode 350 facing the targeted portion of a secured microdevice 110 which can generate a discharge 360 by ionizing materials in the proximity of the secured microdevice 110, resulting in an energy dissipation process that obliterates the targeted information. In different embodiments having an alternative or a parallel connection to the ionizing discharge, the high voltage pulse can be coupled into a resistive load 370 proximal to the targeted portion of the microdevice where pulse heating of the resistive load to very high temperatures obliterates the information stored in the microdevice as a result of accompanied high pressures, detonations, shock waves, or other thermo-mechanical (or acoustic) processes.

Figure 5:
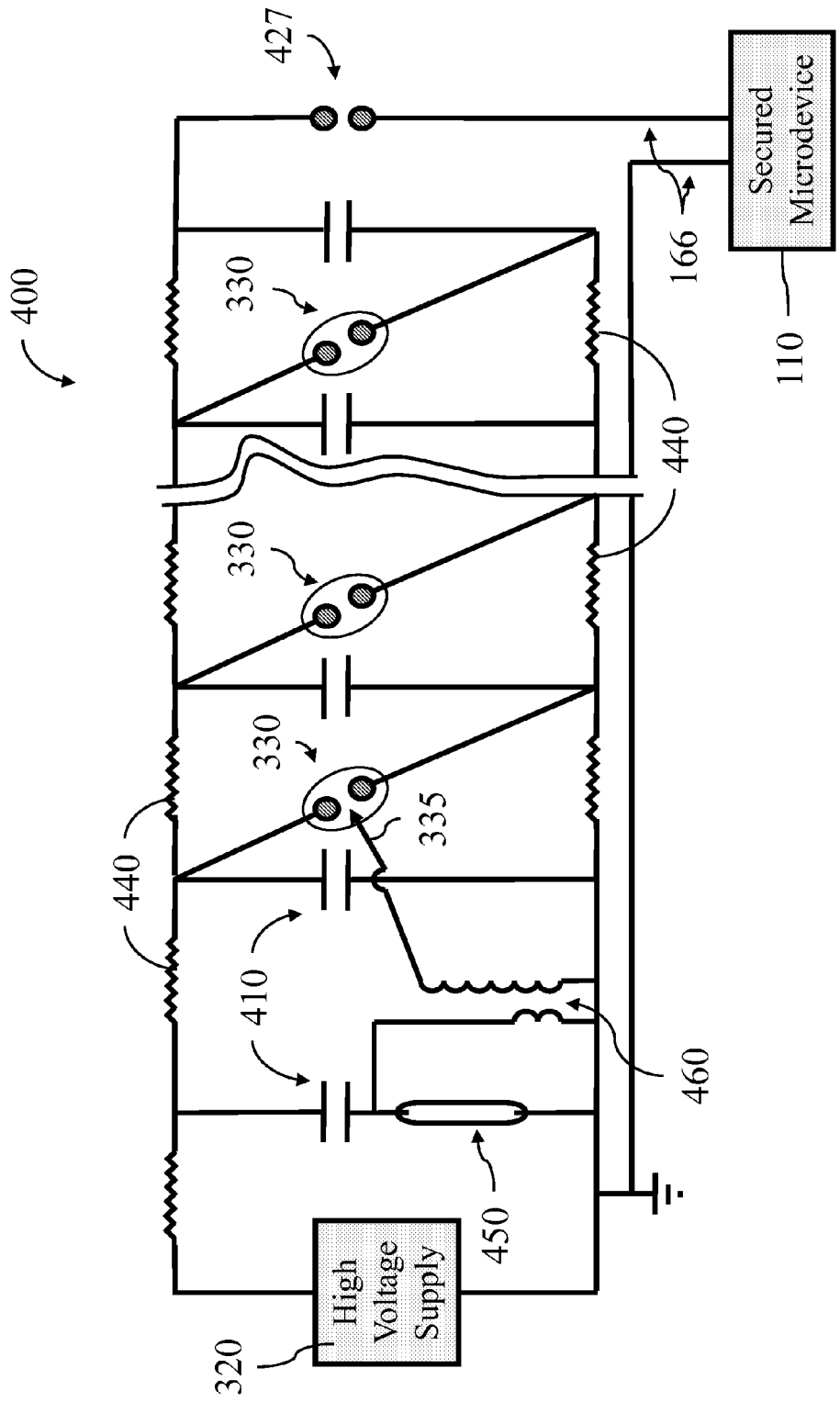
FIG. 5 is a schematic view of an embodiment of a Marx Generator.

An embodiment utilizing a concept that integrates energy storage and pulse forming functions in a Marx Generator device 400 is illustrated in FIG. 5. The Marx Generator stores the energy in capacitors 410 which, together with the spark gaps 330, also serve as pulse forming components. Capacitors 410 are charged in parallel by a high voltage power supply via charging resistors 440 to the designed voltage. This high voltage power supply can be in the form of a rectified high voltage transformer, switching power supply, or any other DC or low frequency AC device with sufficient power to charge the capacitors. In the particular embodiment in FIG. 5, the Marx Generator 400 is arranged to operate in the self-breakdown mode. All the capacitors are charged to the voltage limited by the self-breakdown voltage of a flash-tube 450 (which can be substituted by any self-triggering switch capable of self-triggering in the vicinity of a predetermined voltage).

In the illustrated embodiment an initial stage spark gap 330 of the Marx Generator is triggered using a pulse from the trigger transformer 460 and trigger electrode 335. Gaps 330 of the subsequent stages close in a rapid succession because the voltages on the gaps 330 are driven above the gap 330 breakdown voltage by preceding gap closures. Closing of the gaps configures all the storing capacitors 410 into a series configuration causing the discharge of a high voltage pulse into a transmission line 166. In order to achieve even more rapid pulse rise time, a peeking gap 427 is customarily used in order to ensure delivery of the pulse to the secured microdevice 110 at the time when the majority of the spark gaps 330 are in a conducting stage and to optimize coupling to reactive load impedances.

Figure 6:
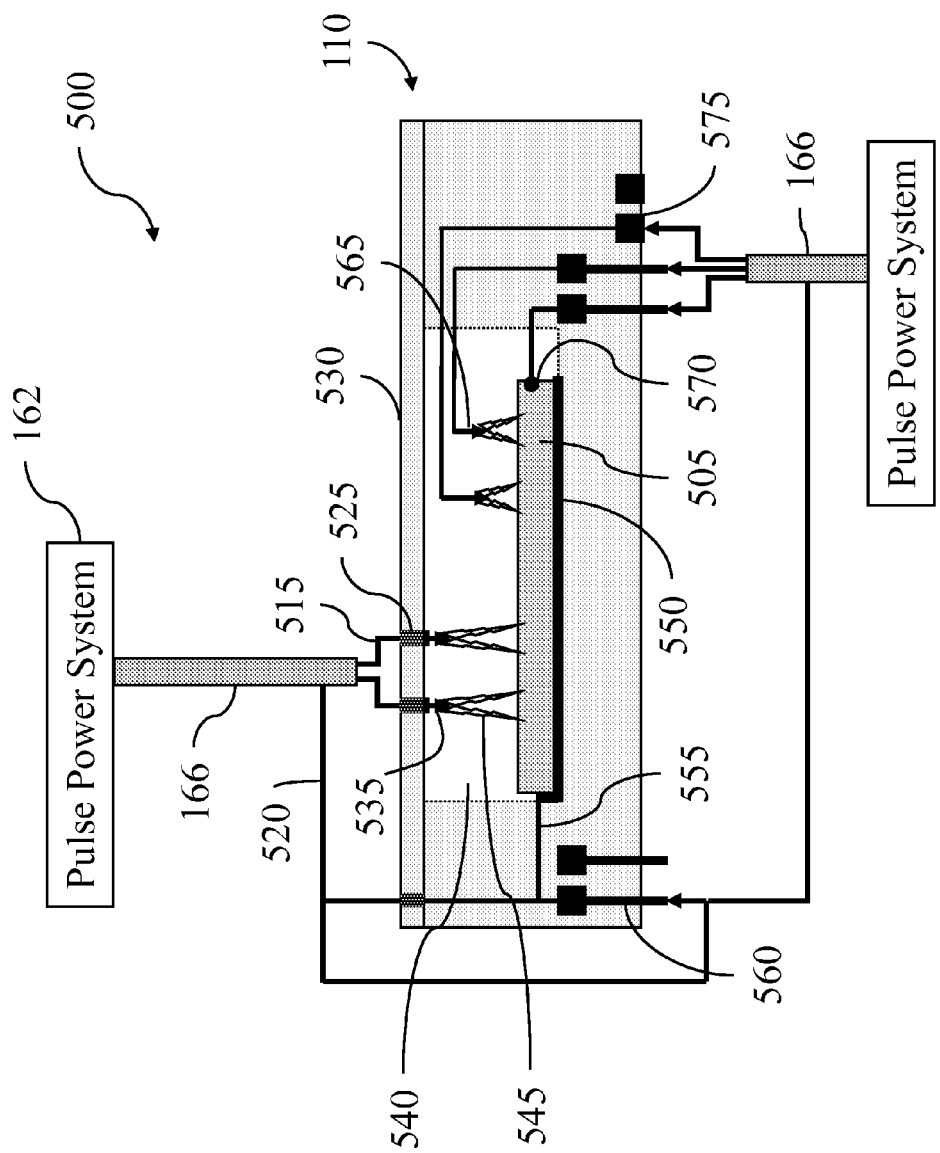
FIG. 6 is a schematic view of an embodiment of apparatus in accordance with the present invention.

An embodiment illustrating an apparatus 500 for coupling energy from a pulse power system 162 to the information containing regions 505 of a secured microdevice 110 is illustrated in FIG. 6. Transmission lines 166, containing at least one independent high potential conductor 515 and at least one low potential return current conductor 520, all separated from each other by an electrical insulator, transport electrical energy to the secured microdevice 110. Such energy is delivered to the interior of the secured microdevice 110 through connectors 525 in the cover 530 (or through any other surface)

of the secured microdevice 110. In the interior of the microdevice 110, an electrode 535 is attached to connector 525 in a position adjacent to the information containing regions 505 of the microdevice 110. The volume between the electrode and the information containing region 505 is at least partially filled with a dielectric material 540 capable of sustaining a high voltage discharge. Upon arrival of high voltage from the pulse power system 162, the dielectric material 540 electrically breaks down to produce at least one ionized conduction path 545 across the space between the electrode 535 and the information containing region 505. Electrical current flows via the conduction paths 545 to the information containing region 505 and then further flows on the surface and/or through the volume of the information region 505 to a conducting grounding plane 550 region adjacent to a different side of the information containing region 505. To complete the electrical circuit, the current is shown having an exit path through internal microdevice 110 conductors 555 to connection pins 560, or alternatively through dedicated connectors 525 in the microdevice housing, to the low potential current return 520 side of the transmission line 166. The electrical energy dissipated in the near vicinity, on the surface, and in the volume of the information containing region 505 of secured microdevice 110 is of sufficient magnitude to obliterate the secured information stored in the information containing regions 505 of the microdevice 110. In a different embodiment having an alternative delivery of the electrical energy, the high potential conductors 515 from the transmission line 166 are connected to the connection pins 560 connectors or surface mounting pad 575 connectors of the secured microdevice 110, and high voltage is directed to internal electrodes 565 adjacent to the information containing region 505 or to direct connections 570 to the information containing region 505.

Figure 7:
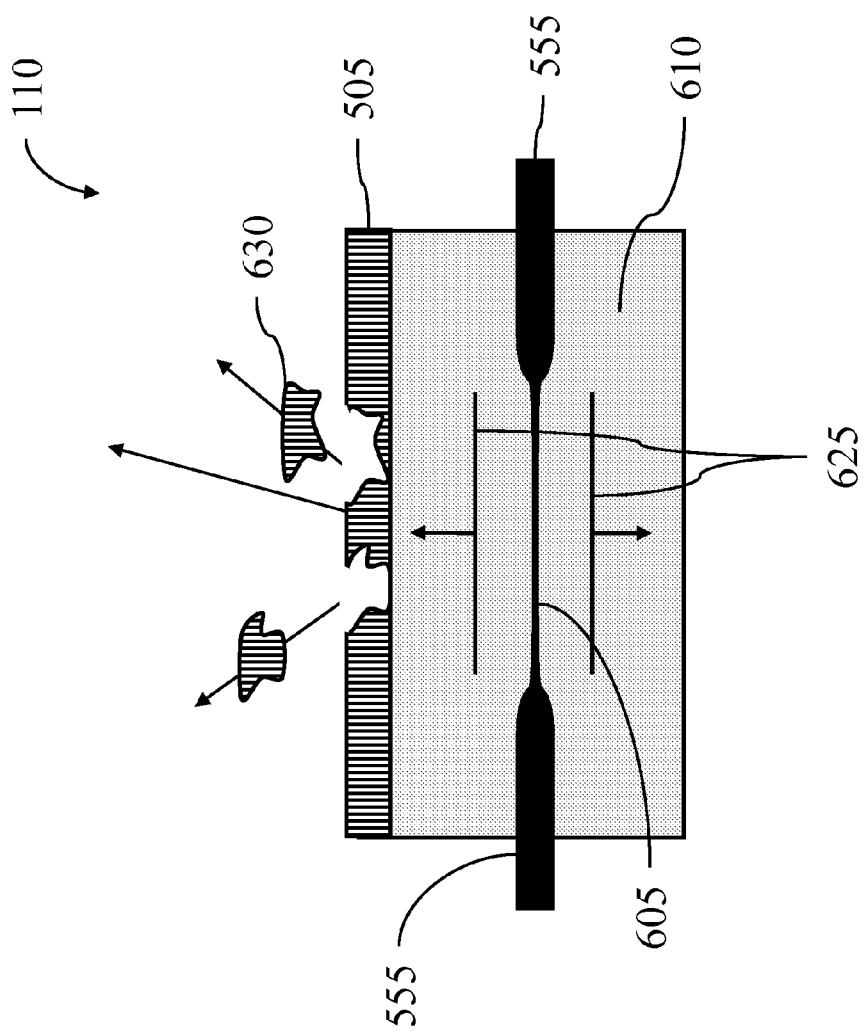
FIG. 7 is a schematic view of an embodiment of apparatus in accordance with the present invention.

A schematic of an embodiment of a secured microdevice 110 employing a separate dissipative load structure 605 is illustrated in FIG. 7. The separate dissipative load structure 605 is embedded in a volume of dense material 610 (with densities of 0.1 gm/cm$^3$ or greater) adjacent to the information containing region 505 of the secured microdevice 110. The separate dissipative load structure 605 has physical properties that cause the resistance of the separate load structure 605 to be higher than the conductors 555 that are attached to it. In the illustrated embodiment, the resistance of the dissipative load structure 605 is made much higher by reducing the cross-sectional area of the conductor 555. As an alternative, different materials with higher resistivity as well as with smaller cross-section than the conductor 555 can be used. In the event that obliteration of information is desired, a high voltage pulse of electrical current is discharged into the separate dissipative load structure via the conductors 555 that are attached to it. This can be done with an apparatus 300, as illustrated in FIG. 4, where the resistive load 370 is comprised of the separate dissipative load structure 605 and dense material 610. The electrical energy from the pulse generator is deposited in the separate dissipative load structure 605, thereby heating it to an elevated temperature and producing super-atmospheric local pressures. Typically, short pulses and dense embedding materials 610 are used to increase the pressure in the separate dissipative load structure 605. By choosing pulse times that are short with respect to the time needed for the deposited heat to diffuse through the volume of matter in the immediate vicinity of the separate dissipative load structure 605 and the information containing region 505, the deposited energy is localized such that the energy per unit volume of matter, the local temperature, and local pressure are maximized. Also, materials of high density are more resistant to compression and are less likely to yield quickly under action from the high pressures in the vicinity of the separate dissipative load structure. Use of dense embedding materials confines the high pressure region and minimizes the loss of energy and pressure by overly quick initial expansion of the separate dissipative load structure 605. The quick buildup of unbalanced pressure in the interior of the region adjacent to the information containing region 505 is used to produce unbalanced forces that drive a strong pressure wave 625 that overcomes the material strength of the embedding material and the material of the information containing region. This results in the shattering, fragmentation 630, and obliteration of information in the information containing region 505.

Figure 8:
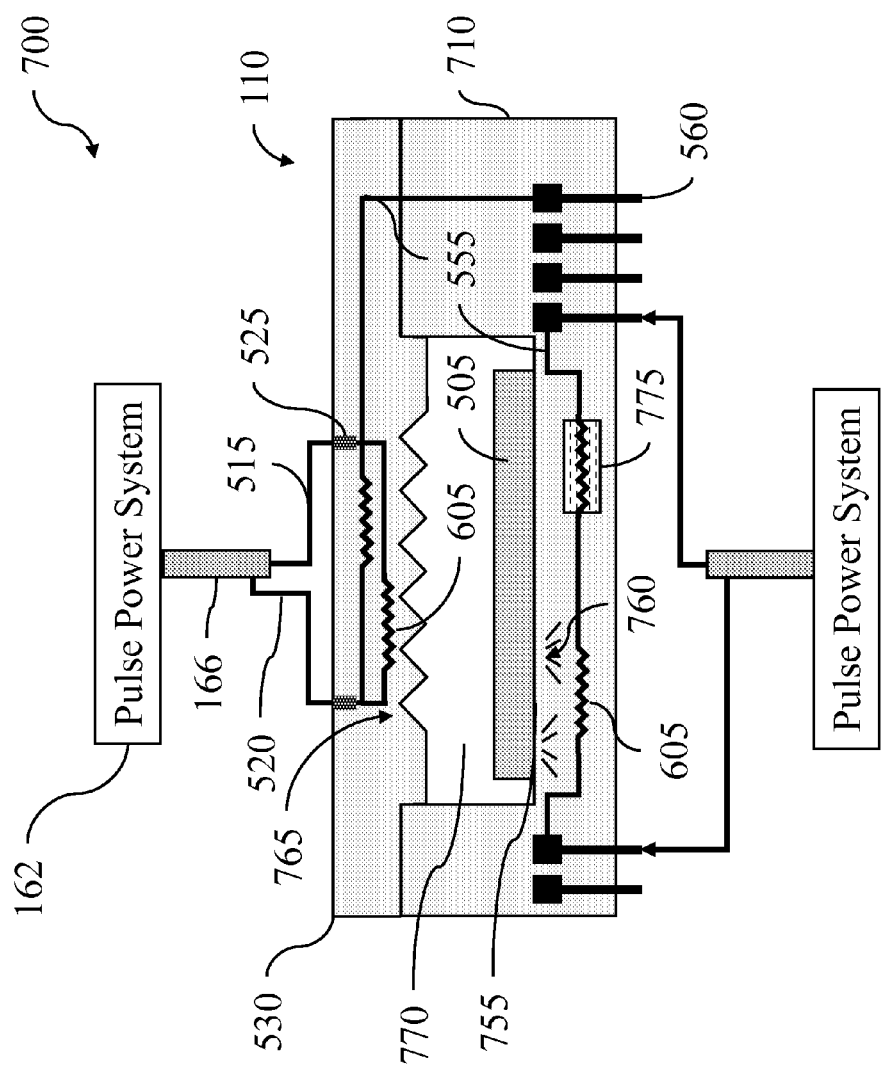
FIG. 8 is a schematic view of an embodiment of apparatus in accordance with the present invention.

Another embodiment using an apparatus 700 for coupling energy from a pulse power system 162 to the information containing regions 505 of a secured microdevice 110 for obliteration of information is illustrated in FIG. 8. The secured microdevice 110 is shown schematically as having a microdevice housing body 710, microdevice housing top 530, and an information containing region 505 that may be a semiconductor die, MEMS device, or any other information processing device. Transmission lines 166 containing at least one independent high potential conductor 515 and at least one low potential return current conductor 520, all separated from each other by an electrical insulator, transport electrical energy to the secured microdevice 110. Such energy is delivered to the interior of the secured microdevice 110 through connectors 525 in the cover 530 (or through any other surface) of the secured microdevice 110. Alternatively, electrical energy for information obliteration can be brought into the interior of the secured microdevice 110 by connecting the high potential conductors 515 and/or low potential conductors 520 from the transmission line 166 to the connection pins 560 of the secured microdevice 110. Separate dissipative load structures 605, shown schematically with the standard resistor symbol, are connected with conductors 555 to the connectors 525 or pins 560 that are further connected to the pulse power system 162 via the transmission lines 166. Single dissipative load structures 605 can be connected to individual pulse power systems 162, or a plurality of such dissipative load structures 605 can be connected in series or in parallel to a single pulse power system 162. The separate dissipative load structures 605 are embedded within the volume of the microdevice housing body and/or the microdevice housing cover in the vicinity of the information containing region 505. As described for the embodiment illustrated in FIG. 7, the application of a high power electrical pulse from the pulse power system 162 produces elevated pressures in the dissipative load structure 605 such that the propagation of this elevated pressure through the embedment volume of the microdevice housing 710 and to the interface surface 755 between the microdevice housing 710 and the information containing region 505 produces sufficient unbalanced forces to physically destroy the information containing region 505 and obliterate the sensitive information of the secured microdevice 110. Destruction of the information containing region 505 can be enhanced by use of mechanically stressed regions 760 in the microdevice housing 710 material, in the space between the separate dissipative load structure 605 and the information containing region 505. One embodiment that includes prefabricated stress regions 760 in a material under pressure can be arranged by the placement of grooves 765 on its surface. Such grooves 765 are shown placed on the inside surface of the microdevice housing cover 530, facing the information containing region 505. With the application of a high power electrical pulse to the separate dissipative load structure 605, adjacent to the grooves 765, the action of the high pressure breaks up the groove structure and projects high velocity groove fragments across the vacuum or gas filled space 770 onto the surface of the information containing region 505. The impact of high velocity groove 765 fragments hitting the information containing region 505 produces mechanical damage to the information containing region and obliterates the information stored in that region. Also shown in FIG. 8 is a dissipative load structure 605 that is imbedded in a small volume of energetic material 775 capable of supporting an exothermic chemical reaction or reactions when initiated, and the two are further embedded in the volume of the microdevice housing 710 of the secured microdevice 110. The energetic material 775 (for example, a rapidly burning fuel, an explosive compound, thermite, or mixtures and combinations of such materials) can be ignited by the high temperatures that are produced in the separate dissipative load structure 605 at the time of pulse power system 162 discharge. This further adds to the locally released energy and increases the production of elevated pressures and temperatures, and thus enhances energy density of the medium causing the destruction of the information containing region 505.

Figure 9:
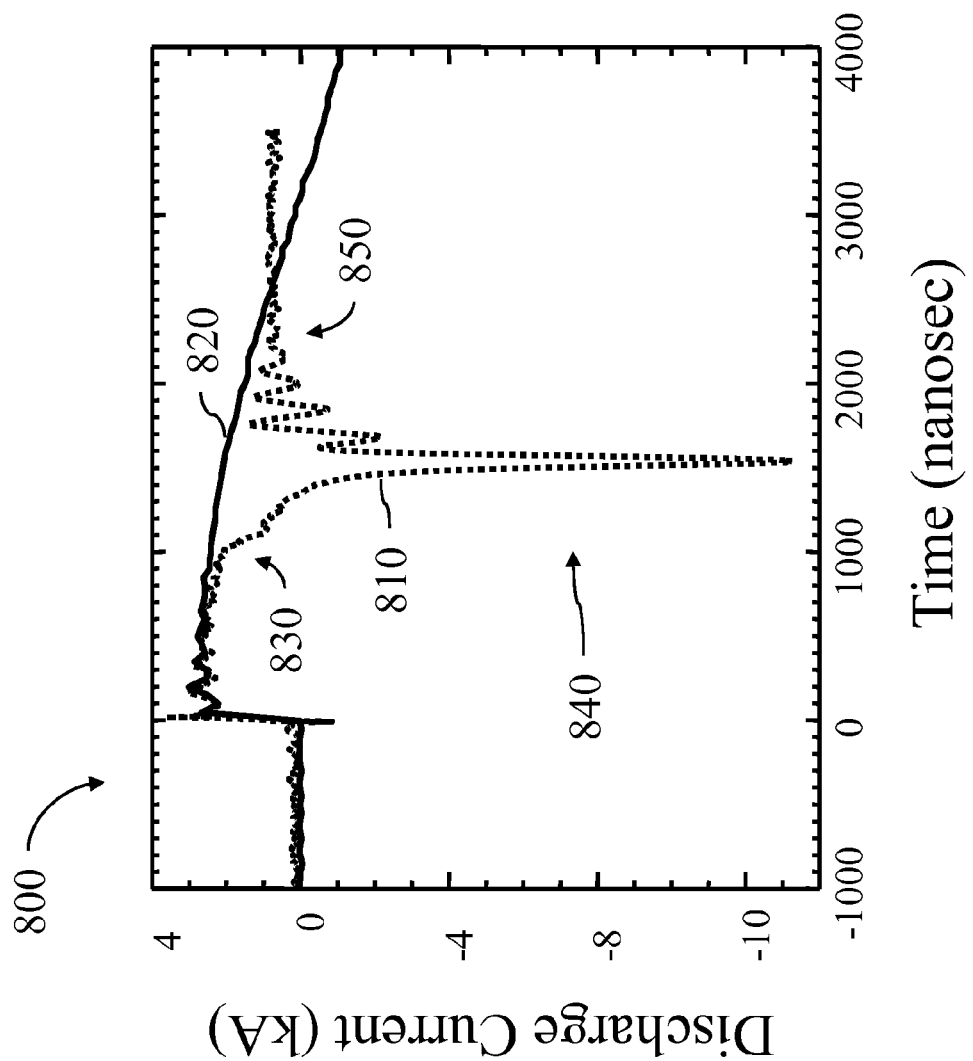
FIG. 9 is a graphic representation of the time dependence of discharge currents in an embodiment of apparatus in accordance with the present invention.

A plurality of devices having an assembly for localized controlled release of the energy in a proximity of the information containing region for controlled obliteration of information contained in the information containing region in accordance with the embodiments illustrated in FIG. 4 and FIG. 8 was constructed and tested at an Enterprise Sciences, Inc., laboratory. One example included a commercial "Am27C040" CMOS EPROM memory integrated circuit chip modified by cutting a thin slot (about 1 mm or less in width) in the ceramic base of the chip housing (710 of FIG. 8) immediately below (about 0.1 mm) the semiconductor die (505 in FIG. 8) of the integrated circuit. A ~5 mm long copper wire (diameter of approximately 0.08 mm), used as the special dissipative load structure 605 of FIG. 8, was connected at both ends to a much thicker copper wire (the conductor 555 of FIG. 7) exhibiting higher conductivity. This separate dissipative load structure was then placed in the slot and tamped in place with a ceramic cement. The two conductor 555 wires were then connected to a pulse power system 162 as illustrated in FIG. 4 where the special dissipative load structure 605 is also the resistive load 370 and the connection is made via the transmission line 166. In the experiment, the transmission line 166 includes a pair of copper wires with no particular orientation, the inductor 380 has an inductance value of 600 nanohenries, the capacitor 310 has a capacitance value of 4.7 microfarads, the high voltage supply 320 is set to charge the capacitor 310 to 1000 volts, and the spark gap 332 is a self-triggered gap with a breakdown voltage of 1000 volts. The capacitor 310 was charged, the spark gap was triggered at 1000 volts, and the energy stored in the capacitor 310 was discharged into the separate dissipative load structure 605. The current pulse of this discharge was measured and is displayed in the oscilloscope traces 800 illustrated in FIG. 9. Trace 810 (dotted line) illustrates a discharge with the separate dissipative load structure 605 as described above in this paragraph, whereas trace 820 corresponds to a discharge where the separate dissipative load structure 605 is replaced with a conductor 555. With the separate dissipative load structure 605, the current exhibits an abrupt reduction 830 as the temperature of the dissipative load structure 605 increases because of absorbed energy, and the resistive load 370 increases its resistance. Subsequently, the circuit responds to these changes in resistance by producing a strong negative pulse 840, finally ending with the cessation 850 of the current pulse as most of the energy is dissipated in the separate dissipative load structure 605. In contrast, without the separate dissipative load structure 605, but with the conductor 750 in its place, the current flow 820 oscillates many times (only about the first one-half period is shown here) between positive and negative values as is standard for a weakly damped LRC circuit. The discharge that produced the current pulse, represented by trace 810, through the separate dissipative load structure 605 also causes significant physical changes to the chip housing 710 in which it was embedded. The chip housing was broken into two large pieces corresponding to the housing ends, lying furthest away from the center, whereas the central region as well as the semiconductor die were shattered into a multitude of much smaller pieces. The semiconductor die which was the information containing region 505 of the "Am27C040" CMOS EPROM memory integrated circuit chip—serving as the secured microdevice 110—was completely destroyed and all secured information was obliterated.

Figure 10:
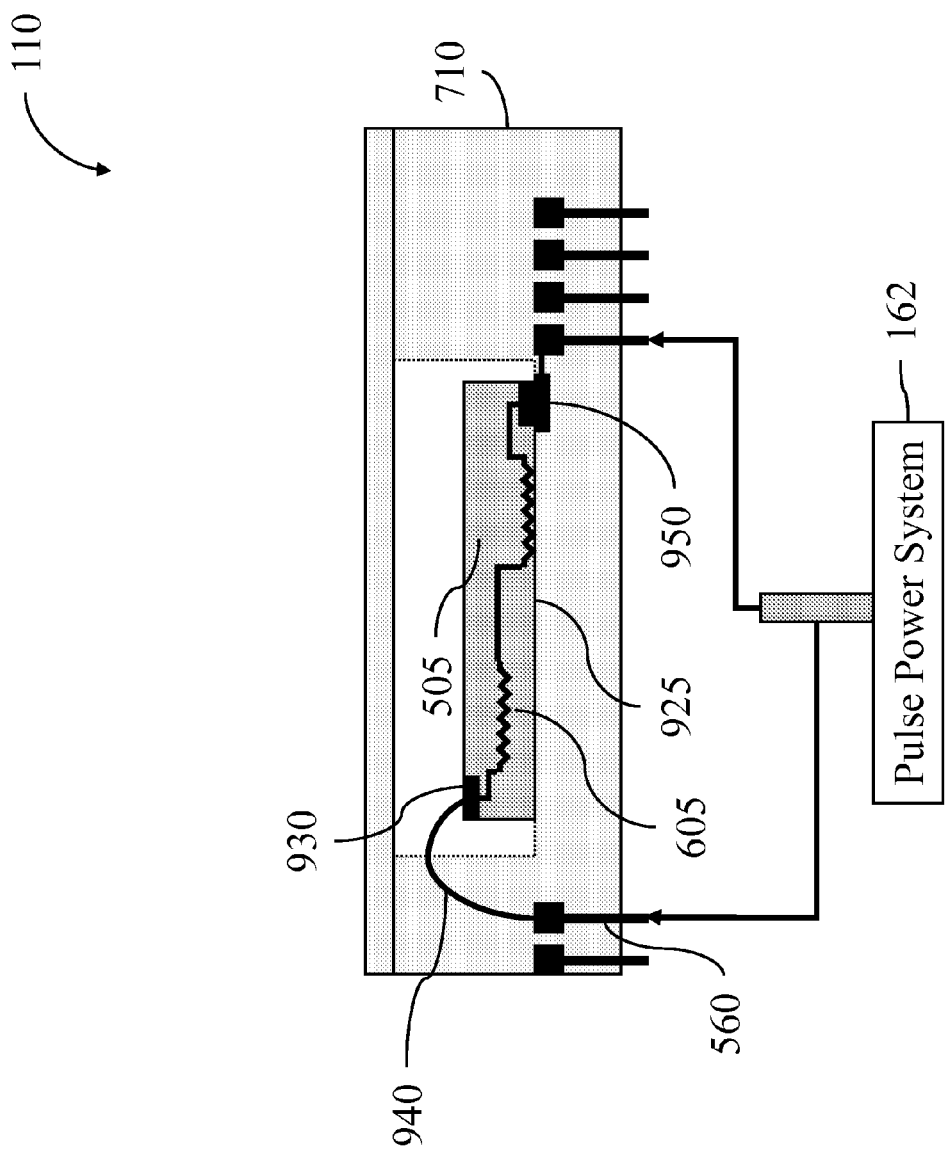
FIG. 10 is a schematic view of an embodiment of apparatus in accordance with the present invention.

FIG. 10 illustrates an embodiment of the invention where at least one separate dissipative load structure 605 is incorporated in the information containing region 505 or on the surface 925 of the information containing region 505 of the secured microdevice 110. In one class of embodiments the separate dissipative load structures 605 can be integrated during the manufacture of the information containing region 505. In different classes of embodiments, the separate dissipative load structures 605 can be retrofitted after manufacture of the information containing region 505. The separate dissipative load structures 605 can be connected to connection points 930 on the top, bottom, or side of the information containing region 505. The illustrated connection point 930, at the bottom, is shown contacting a connection point 950 in the housing 710 of the secured microdevice 110 for further connection to pulse power system 162 via connection pins 560 of the housing. Also shown is an individual wire connection 940 that can be used to connect the contact point 930 of the information containing region 505 to a housing connection pin 560 of the secured microdevice 110. A discharge of the pulsed power system 162 into the separate dissipative load structure 605 obliterates the information in the information containing region 505.

Figure 11:
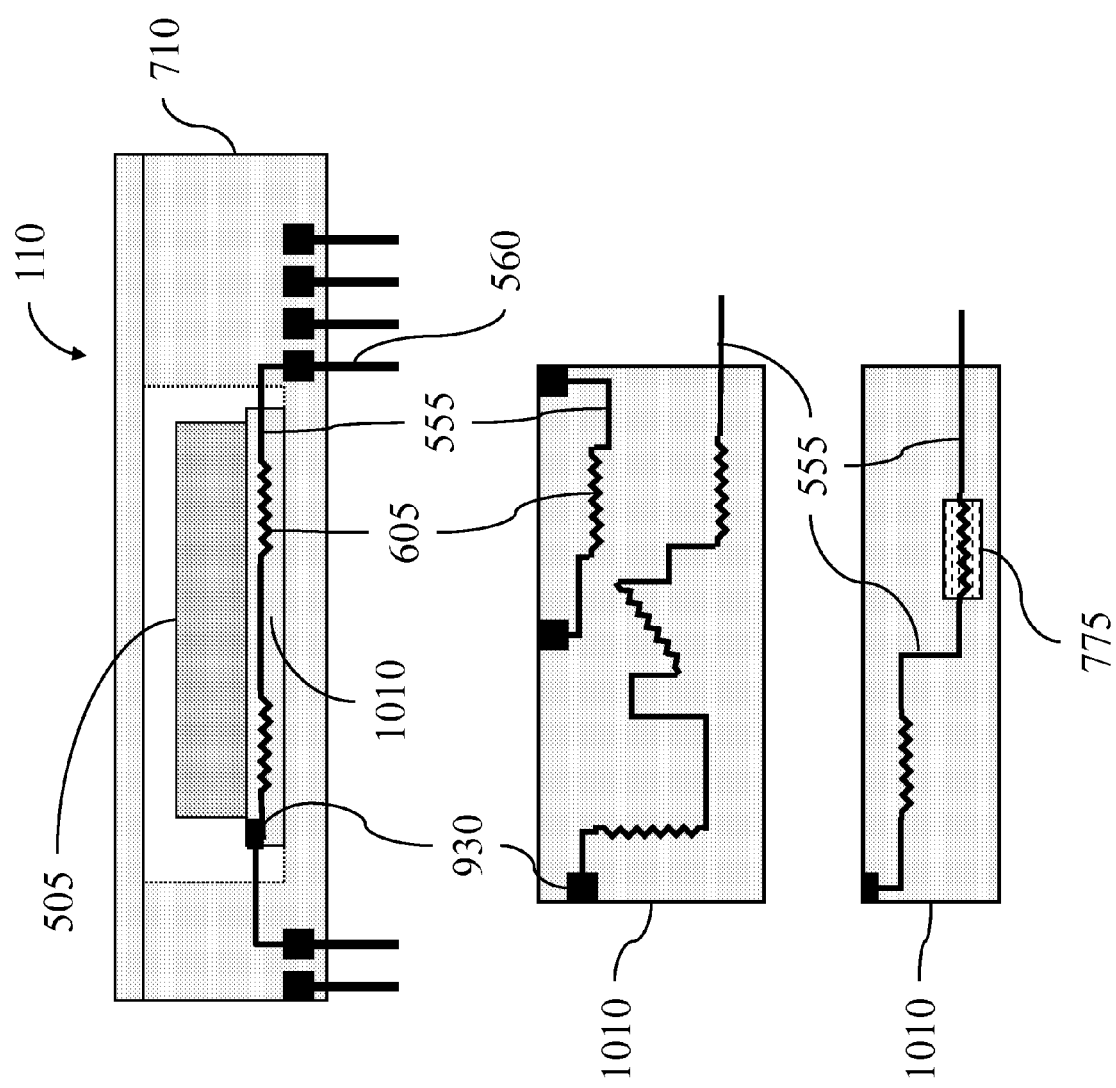
FIGS. 11A, 11B, and 11C are schematic views of a different embodiment of a microdevice in accordance with the present invention.

In yet another embodiment, a secured microdevice 110 is illustrated in FIG. 11a with a load carrier 1010 positioned between the information containing region 505 and the protective housing 710 of the secured microdevice 110. FIG. 11b shows a top view of a load carrier 1010 whereas FIG. 11c shows a side view of a load carrier 1010. The load carrier 1010 is a device that includes at least one separate dissipative load structure 605 and/or at least one dissipative load structure with energetic material 775 that are embedded in the material of the load carrier 1010 or located on one of the surfaces of the load carrier 1010. The load carrier 1010 also contains electrical conductors 555 and electrical contact points 930 for making electrical connections to an external pulse power system 162. FIG. 11a illustrates the connection of the load carrier's 1010 conductor 555 leads and contact points 930 to the connection pins 560 of the secured microdevice 110 for further connection to an external pulse power system 162. Multiple different positions and orientation of the dissipative load structures 605, conductors 555, and contact points 930 are shown to indicate that these can be configured as necessary. Obliteration of information contained in the information containing region 505 of the secured microdevice 110 is produced by discharging a pulse power system 162 into the separate dissipative load structures 605 contained in the load carrier 1010. The discharge brings sufficient energy and/or unbalanced forces to destroy the information containing regions 505 and information that are in the vicinity of the load carrier.

Figure 12:
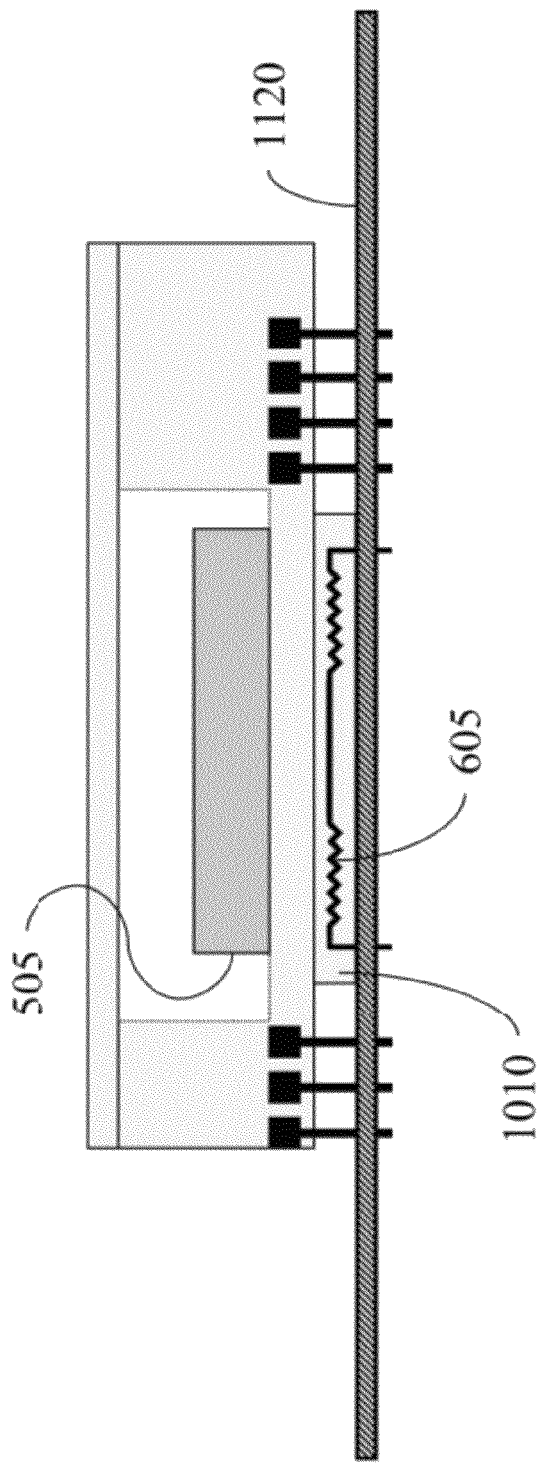
FIG. 12 is a schematic view of an embodiment of apparatus in accordance with the present invention.

Load carriers 1010 can also be used in external configurations where unsecured microdevices 1100 can be converted into secured microdevices 110 by positioning the unsecured microdevice 1100 so that its information containing region 505 is in close contact to the load carrier 1010 and its separate dissipative load structures 605. An embodiment illustrating this concept is shown in FIG. 12, where a load carrier 1010 is shown positioned between the bottom of an unsecured microdevice 1100 and a printed circuit board 1120 or any other means for supporting the unsecured microdevice 1100 in the general processing system. As in previous embodiments, the information in the information containing region 505 is obliterated by a discharge of the pulse power system 162 into the separate dissipative load structure 605 of the load carrier 1010, generating sufficient localized energy deposition in the information containing region 505 for the destruction of the information containing region 505.

Figure 13A:
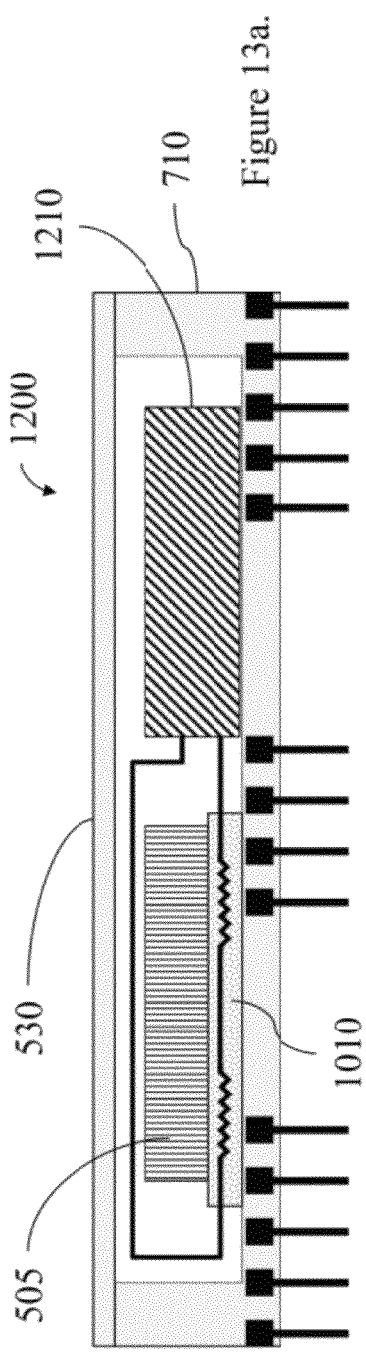
FIGS. 13A and 13B are schematic views of a different embodiment of a microdevice in accordance with the present invention.
Figure 13B:
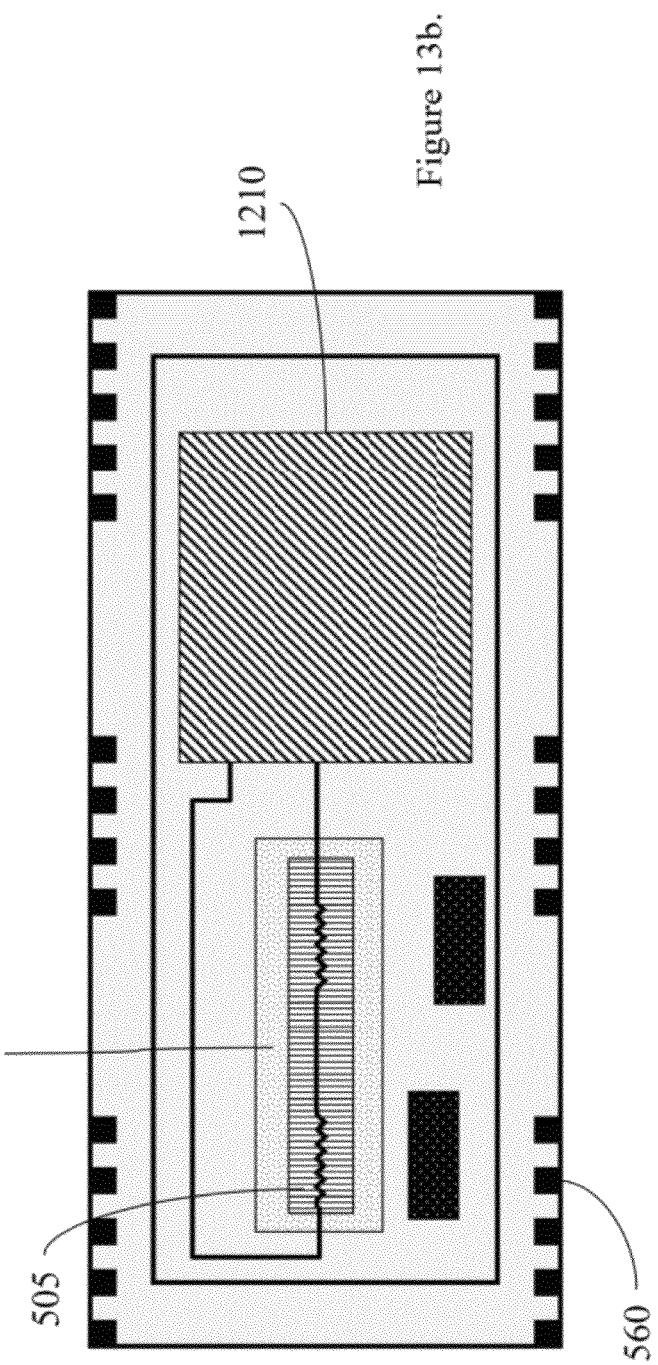

FIG. 13 illustrates an embodiment for a self-secured microdevice 1200 that integrates at least some of the functions of a controller 120, a circuit for controlled release of locally stored energy 160, local energy storage 140, and internal power 155 in an internal subsystem 1210 purposely arranged as a separate functional part of the self-secured microdevice 1200. FIG. 13a is a side view, whereas FIG. 13b is a top view. The self-securing subsystem 1210 is mounted within the interior of the housing 710 and housing cover 530 of the self-secured microdevice 1200. Also contained in the self-secured microdevice 1200 are sensitive information containing regions 505, other components 210 that do not contain sensitive information, and connection pins 560 for making electrical contact with outside systems. The sensitive information regions can be protected from unauthorized access by a load carrier 1010 that is connected to the subsystem 1210 and positioned between the information containing regions 505 and the secured microdevice housing 710. In other embodiments, the information containing regions 505 can be protected by use of special dissipative load structures as illustrated in FIG. 8, but connected to the internal subsystem 1210. In still other embodiments, information containing regions 505 can be protected by use of separate dissipative load structures 605 that are embedded in the information containing region 505 as illustrated in FIG. 10, but connected to the subsystem 1210. And in yet other embodiments, the information containing regions 505 can be protected by use of high voltage discharges as illustrated in FIG. 6, but driven by connections to the internal subsystem 1210.

I claim:

1. A method for prevention of tampering, unauthorized use, and unauthorized extraction of information, from at least one information containing region of a secured microdevice in a processing device by controlled obliteration of said information comprising the following steps: (a) implementing control protocols and hardware which generate at least one command to trigger said controlled obliteration of said information; (b) establishing of a local energy storage device which stores energy in a form of localized electromagnetic fields to be used to initiate and perform said controlled obliteration of said information; (c) establishing of localized controlled release of the stored energy from the local energy storage device and at least partial deposition of the stored energy in a proximity of the at least one information containing region of the secured microdevice, upon generation of said at least one command to trigger said controlled obliteration of said information; (d) maintaining of conditions for controlled release of the energy stored in the local energy storage device upon generation of said command to trigger said controlled obliteration of said information for the duration of time necessary to achieve desired controlled obliteration of said information; wherein the at least partial deposition of stored energy in a form of localized electromagnetic fields in the proximity of the at least one information containing region of the secured microdevices is maintained for a period of time shorter than the time needed for a heat from the energy released in the proximity of the at least one information containing region of the secured microdevice to diffuse through a volume of the at least one information containing region of said secured microdevice.

2. The method of claim 1, wherein the control protocols and hardware are initiated by an extraneous control signal.

3. The method of claim 1, wherein the control protocols and hardware are initiated by an internal clock signal.

4. The method of claim 1, wherein the control protocols and hardware are initiated by signals interpreted to be indicators of tampering and unauthorized extraction of information.

5. The method of claim 1, wherein the information contained in the at least one information containing region of the secured microdevice at least in part in a form of a structure of the secured microdevice's architecture formed during fabrication of the secured microdevices.

6. The method of claim 1, wherein the information contained in the at least one information containing region of the secured microdevice at least in part in data and data residues incorporated in the information containing region's constitutive materials during programming and utilization of the secured microdevice.

7. The method of claim 1, wherein the local energy storage device comprises at least one capacitor and a circuit that couples the stored energy to a pulse power system.

8. The method of claim 7, wherein the circuit that couples the stored energy includes an electrical switching device that performs a switching operation after receiving an external command to perform said controlled obliteration of information.

9. The method of claim 8, wherein the electrical switching device is operated in self-switching mode.

10. The method of claim 1 further comprising a step of providing a separate dissipative load structure, performed after step (b) and before step (c) of claim 2, where the local energy storage device is coupled to the dissipative load structure arranged in a proximity of a portion of an active volume of the secured microdevice.

11. The method of claim 10, wherein the separate dissipative load structure is arranged to be embedded in matter having a density of more than 0.1 grams per cubic centimeter.

12. The method of claim 11, wherein the separate dissipative load structure comprises at least one resistor positioned in the proximity of the portion of the active volume of the secured microdevice, and at least one conductor arranged to conduct high power discharge currents in direct contact with the resistor.

13. The method of claim 12, wherein the at least one conductor arranged to conduct high power discharge currents is directly connected to a dedicated connector arranged to conduct high power discharge currents when energized by the energy stored in the local energy storage device.

14. The method of claim 10, wherein the separate dissipative load structure is incorporated into the at least one information containing region of the secured microdevice.

15. The method of claim 10, wherein the separate dissipative load structure is incorporated into a protective housing of the secured microdevice.

16. The method of claim 15, wherein the separate dissipative load structure is incorporated into the protective housing of the secured microdevice and positioned between the at least one information containing region and the protective housing of the secured microdevice.

17. The method of claim 16, wherein the separate dissipative load structure is incorporated into at least one inner surface of the protective housing of the secured microdevice and positioned in proximity of the at least one information containing region of the secured microdevice.

18. The method of claim 1, wherein conditions for the controlled release of the energy stored in the local energy storage device are maintained so as that at least two chargings of the local energy storage device and subsequent discharging of the stored electromagnetic energy in the proximity of the at least one information containing region of the secured microdevice are performed to achieve the controlled obliteration of information.

19. The method of claim 18, wherein the at least one energetic composition is positioned between the protective housing of the secured microdevice and an attachment supporting the secured microdevice into the processing device.

20. The method of claim 1, wherein at least another local energy storage is located in the proximity of the at least one information containing region of the secured microdevice and comprises at least one energetic composition arranged to support an exothermic chemical reaction after ignition initiated by the at least partial deposition of the stored energy in the form of localized electromagnetic fields.

21. The method of claim 20, wherein the at least one energetic composition is thermite.

22. The method of claim 20, wherein the at least one energetic composition is incorporated into a protective housing of the secured microdevice.

23. An apparatus for prevention of tampering, unauthorized use, and unauthorized extraction of information from at least one information containing region of a secured microdevice in a processing device by controlled obliteration of said information comprising: (a) control hardware arranged to generate at least one command to trigger said controlled obliteration of said information; (b) a local energy storage device which stores energy in a form of localized electromagnetic fields to be used to initiate and perform said controlled obliteration of said information; (c) a circuit for localized controlled release of the stored energy from the local energy storage device and at least partial deposition of the stored energy in a proximity of the at least one information containing region of the secured microdevice, upon generation of said command to trigger said controlled obliteration of information; wherein the circuit for localized controlled release of the stored energy is arranged for controlled release of the energy stored in the local energy storage upon generation of said command to trigger said controlled obliteration of said information for the duration of time necessary to achieve desired controlled obliteration of said information; and wherein the circuit for localized controlled release of the stored energy is arranged to maintain the at least partial deposition of the stored energy in the proximity of the at least one information containing region of the secured microdevice to diffuse through a volume of the at least one information containing region of said secured microdevice.

24. The apparatus of claim 23, wherein the local energy storage device comprises at least one capacitor and a circuit to couple the stored energy to a pulse power system.

25. The apparatus of claim 24, wherein the local energy storage further comprises at least one Marx Generator charged by a high voltage power supply and is switched by an electrical switching device.

26. The apparatus of claim 25, wherein the Marx Generator is operated in a self-break-down mode.

27. The apparatus of claim 23, wherein the circuit for localized controlled release of the stored energy comprises a separate dissipative load structure incorporated in the secured microdevice.

28. The apparatus of claim 27, wherein the separate dissipative load structure comprises at least one resistor positioned in a proximity of a portion of the at least one information containing region of the secured microdevice and at least one conductor arranged to conduct high power discharge currents in direct contact with said at least one resistor.

29. The apparatus of claim 28, wherein the at least one conductor arranged to conduct the high power discharge currents is directly connected to a dedicated connector arranged to conduct high power discharge currents when energized by the energy from the local energy storage device.

30. The apparatus of claim 27, wherein the separate dissipative load structure is incorporated in the at least one information containing region of the secured microdevice.

31. The apparatus of claim 27, wherein the separate dissipative load structure is incorporated in a protective housing of the secured microdevice.

32. The apparatus of claim 31, wherein the separate dissipative load structure is incorporated in the protective housing of the secured microdevice and positioned between the information containing region and the protective housing of the secured microdevice.

33. The apparatus of claim 31, wherein the separate dissipative load structure is incorporated in at least one inner surface of the protective housing of the secured microdevice and positioned in proximity of the information containing region of the secured microdevice.

34. The apparatus of claim 31, wherein at least one separate dissipative load structure is arranged to form a load carrier and the load carrier is positioned between the at least one information containing region and the protective housing of the secured microdevice.

35. The apparatus of claim 31, wherein at least one separate dissipative load structure is arranged to form a load carrier and the load carrier is positioned between the protective housing of the secured microdevice, in proximity of the at least one information containing region, and a supporting structure that supports the secured microdevice.

36. The apparatus of claim 23, wherein the circuit for localized controlled release of the energy from the local energy storage device and at least partial deposition of the stored energy in the proximity of the at least one information containing region of the secured microdevice, upon generation of said command to trigger said controlled obliteration of said information comprises a transmission line for conduction of electric energy from the local energy storage device to the proximity of a semiconductor secured microdevice.

37. A secured microdevice for use in a processing device that is resistant to tampering and unauthorized use and unauthorized extraction of information comprising: at least one information containing region with a structure organized to store and process said information, a protective housing with at least one inner and outer surface, contact connectors and associated conduits for conduction of said information, and an assembly for localized controlled release of energy in a proximity of the information containing region for controlled obliteration of the information contained in the at least one information containing region having at least one discharge electrode incorporated in a secured microdevice protective housing for initiation and support of an electrical discharge between said at least one discharge electrode and predetermined portions of the at least one information containing region for a period of time shorter than the time needed for a heat from the energy released in the proximity of the at least one information containing region of the secured microdevice to diffuse through a volume of the at least one information containing region of said secured microdevice.

38. The secured microdevice of claim 37, wherein the assembly for localized controlled release of the energy comprises at least one discharge locus that protrudes from the predetermined portions of the at least one information containing region toward the at least one discharge electrode incorporated in the secured microdevice protective housing for initiation and support of the electrical discharge between said at least one discharge electrode and the at least one protruding discharge locus.

39. The secured microdevice of claim 37, comprising at least one connector with an associated conductor arranged to present a conduction path to conduct high power discharge current to parts of the processing device.

40. The secured microdevice of claim 37, wherein the assembly for localized controlled release of the energy in the proximity of the at least one information containing region includes at least one separate dissipative load structure.

41. The secured microdevice of claim 40, wherein the at least one separate dissipative load structure is incorporated in the at least one information containing region of the secured microdevice.

42. The secured microdevice of claim 40, wherein the at least one separate dissipative load structure is incorporated in the protective housing of the secured microdevice.

43. The secured microdevice of claim 40, wherein the at least one separate dissipative load structure is positioned between the at least one information containing region and the protective housing of the secured microdevice.

44. The secured microdevice of claim 40, wherein the at least one separate dissipative load structure is incorporated into said at least one inner surface of the protective housing of the secured microdevice and is positioned in said proximity of the at least one information containing region of the secured microdevice.

45. The secured microdevice of claim 40, wherein the at least one separate dissipative load structure is positioned between the protective housing of the secured microdevice and a means for supporting the secured microdevice into the processing device.

46. The secured microdevice of claim 37, wherein the assembly for localized controlled release of the energy comprises at least one volume of energetic composition arranged to support an exothermic chemical reaction after the localized controlled release of the energy.

47. The secured microdevice of claim 46, wherein the energetic composition is incorporated in the protective housing of the secured microdevice.

48. The secured microdevice of claim 37, wherein the secured microdevice is a self-secured microdevice comprising a self-securing subsystem that integrates at least a controller, local energy storage, and an internal power supply.

49. The secured microdevice of claim 48, wherein the self-securing subsystem is connected to a load carrier arranged in said proximity of the at least one information containing region.

* * * * *